United States Patent
Svedman et al.

(10) Patent No.: US 11,330,630 B2
(45) Date of Patent: May 10, 2022

(54) DYNAMIC RANDOM ACCESS RESPONSE (RAR) RECEPTION TERMINATION

(71) Applicants: ZTE Wistron Telecom AB, Kista (SE); ZTE (TX) INC., Austin, TX (US)

(72) Inventors: Patrick Svedman, Kista (SE); Yonghong Gao, Kista (SE); Jan Johansson, Kista (SE); Thorsten Schier, Kista (SE)

(73) Assignees: ZTE WISTRON TELECOM AB, Kista (SE); ZTE (TX) INC., Austin, TX (US)

(*) Notice: Subject to any disclaimer, the term of this patent is extended or adjusted under 35 U.S.C. 154(b) by 189 days.

(21) Appl. No.: 16/077,989

(22) PCT Filed: Feb. 10, 2017

(86) PCT No.: PCT/US2017/017541
§ 371 (c)(1),
(2) Date: Aug. 14, 2018

(87) PCT Pub. No.: WO2017/146921
PCT Pub. Date: Aug. 31, 2017

(65) Prior Publication Data
US 2020/0344809 A1 Oct. 29, 2020

Related U.S. Application Data (60) Provisional application No. 62/298,374, filed on Feb. 22, 2016.

(51) Int. Cl.
*H04W 74/08* (2009.01)
*H04W 72/04* (2009.01)
(Continued)

(52) U.S. Cl.
CPC ........ *H04W 74/0833* (2013.01); *H04B 7/024* (2013.01); *H04L 1/0017* (2013.01);
(Continued)

(58) Field of Classification Search
CPC .......... H04W 74/0833; H04W 74/006; H04W 74/08; H04W 72/042; H04W 88/02;
(Continued)

(56) References Cited

U.S. PATENT DOCUMENTS

2011/0205908 A1  8/2011  Yi et al.
2011/0222498 A1  9/2011  Chun et al.
(Continued)

OTHER PUBLICATIONS

Extended European Search Report dated Sep. 13, 2019, in corresponding European Patent Application No. 17756994.4.
(Continued)

*Primary Examiner* — Joshua Kading
(74) *Attorney, Agent, or Firm* — Duane Morris LLP (57) ABSTRACT

A device and method and system for dynamically processing a random access response (RAR) signal to perform wireless communications is disclose. In some embodiments, the device is configured to receive one or multiple random access response (RAR) signals, wherein when the processor receives multiple RAR signals, it selects a RAR signal and responses to the selected RAR signal based on a content of the one or multiple RAR signals and proceeds with subsequent wireless communication using information contained in the selected RAR signal.

22 Claims, 7 Drawing Sheets

(51) Int. Cl.
*H04W 74/00* (2009.01)
*H04W 88/02* (2009.01)
*H04L 12/26* (2006.01)
*H04B 7/024* (2017.01)
*H04W 88/08* (2009.01)
*H04L 47/24* (2022.01)
*H04L 43/08* (2022.01)
*H04L 1/00* (2006.01)
*H04W 28/08* (2009.01)
*H04L 49/20* (2022.01)

(52) U.S. Cl.
CPC .............. *H04L 43/08* (2013.01); *H04L 47/24* (2013.01); *H04W 72/042* (2013.01); *H04W 74/006* (2013.01); *H04W 88/02* (2013.01); *H04W 88/085* (2013.01); *H04L 49/205* (2013.01); *H04W 28/0967* (2020.05)

(58) Field of Classification Search
CPC ................ H04W 88/085; H04L 47/24; H04L 43/08–0894; H04L 1/0017; H04L 49/205; H04L 29/06523; H04L 41/5003; H04L 41/5012; H04B 7/024
See application file for complete search history.

(56) References Cited

U.S. PATENT DOCUMENTS

| | | |
|---|---|---|
| 2012/0076103 A1 | 3/2012 | Dai et al. |
| 2012/0082103 A1* | 4/2012 | Lin .................... H04W 74/085 370/329 |
| 2013/0044657 A1* | 2/2013 | Oh .................... H04W 74/0875 370/310 |
| 2013/0170385 A1 | 7/2013 | Frenger |
| 2013/0259008 A1 | 10/2013 | Dinan |
| 2015/0119058 A1 | 4/2015 | Rune et al. |
| 2015/0304999 A1 | 10/2015 | Rune |
| 2015/0319638 A1 | 11/2015 | Rune |
| 2015/0382205 A1 | 12/2015 | Lee et al. |
| 2016/0021694 A1* | 1/2016 | Pan .................... H04W 72/0413 370/329 |
| 2017/0231011 A1* | 8/2017 | Park .................... H04W 74/006 |
| 2018/0070382 A1* | 3/2018 | Lee .................... H04W 56/001 |
| 2018/0077645 A1* | 3/2018 | Yan .................... H04W 52/0219 |

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 13), 3GPP TS 36321 V13.0.0, Dec. 2015, 82 pages.

International Search Report/Written Opinion dated May 18, 2017, in corresponding International Application No. PCT/US2017/017541.

* cited by examiner

FIG. 1

(PRIOR ART)

FIG. 2

(PRIOR ART)

FIG. 3

(PRIOR ART)

FIG. 4

(PRIOR ART)

DYNAMIC RANDOM ACCESS RESPONSE (RAR) RECEPTION TERMINATION

RELATED APPLICATIONS

This application is a 371 National Phase application of International Application No. PCT/US2017/017541, filed on Feb. 10, 2017 which claims benefit of U.S. Provisional Application No. 62/298,374 entitled "DYNAMIC RANDOM ACCESS RESPONSE (RAR) RECEPTION TERMINATION" filed on Feb. 22, 2016, the contents of which are each incorporated by reference herein in their entireties.

FIELD OF THE INVENTION

The invention is directed to a method and system for processing a random access response (RAR) signal used in telecommunication systems.

BACKGROUND

In many wireless communication systems, a network communicates with mobile devices (henceforth "devices"). The term "network" generally refers to the infra-structure and functionality that provides communications to mobile devices. The network can be understood as a "mobile network" or "cellular network" in various examples. In LTE, for example, devices communicating on a network are usually called user equipment ("UE"). The network transmits and receives wireless signals through transmission and reception points ("TRPs"). In traditional cellular wireless communication systems, different TRPs are often associated with different cells. In this scenario, the term "TRP" typically refers to the antenna system of a base station, e.g. a macro or pico base station. In some cellular wireless communication systems, several different TRPs are associated with the same cell, for example, when the TRPs are remote radio units (RRUs) connected to a base station or a centralized baseband processing unit, when the TRPs constitute a distributed antenna system (DAS), or when some TRPs acts as relays. Different TRP antenna systems are typically not co-located. On the other hand, other components of TRPs, such as baseband processing units, may be co-located. The discussion above refers to one communication carrier, i.e., a carrier center frequency and bandwidth within which the wireless signals are transmitted. However, a TRP often supports simultaneous communication on multiple different carriers. In such cases, it is common that a TRP is associated with different cells on different carriers.

A network node (hereinafter "node") is an abstract entity with which a device may communicate. UMTS cells (commonly referred to as "NodeBs") and LTE cells (commonly referred to as "eNodeBs") are examples of nodes. A node is often associated with certain parameters and/or signals, that distinguish it from other nodes. For instance, such parameters/signals may include sequence indices, scrambling sequences, resources for reference signals (RS), synchronization signals, cell ID, virtual cell ID, etc. A node may use one or more TRPs for communication. In an example, multiple TRPs may provide a single cell in UMTS or LTE communication networks. In another example, one TRP may provide multiple nodes or participate in providing multiple nodes, even on the same carrier. To "provide a node" here refers to transmission and reception of signals related to the node. In some other examples, a node may include a cloud cell, a soft cell, and/or a hyper cell, as are known in the art.

In the context of LTE, an eNodeB can be a logical entity (in connection with one or more "cells") rather than a physical entity. For instance, an eNodeB may be "implemented" in one base station (a "physical entity") or in multiple base stations. Conversely, a base station may implement multiple eNodeBs. Traditionally, a base station is a cabinet with various hardware components connected to a number of antennas. In some embodiments discussed herein, a TRP is a physical entity with a number of co-located antennas. In some cases, a full base station implementation may be co-sited with the antennas (as in traditional deployments). In other cases, hardware can be centralized in a "centralized processing unit." Such a unit may "implement" a large number of eNodeBs (in the LTE case). The central unit uses various TRPs to transmit and receive the radio signals. In general, an eNodeB is a logical entity and a TRP is a physical entity. In some cases, however, a single TRP that can transmit and receive signals resembles a single eNodeB. In some embodiments, a TRP is more related to the antenna system, while a base station (in the traditional sense) includes antennas and various radio and baseband processing hardware components in one "installation." However, in some alternative implementations, a TRP can also be a base-station.

In some wireless communication systems, devices may act as TRPs, for instance as relays. As such, the device may assist other devices to access the network. Hence, a device may act as a node. For brevity, in the following discussion, "TRP" may refer to transmission and reception points and/or a "node."

In some wireless communication systems, devices may communicate directly with each other, without having to relay the signals through a TRP and the network. As such, a first device may act as a node and a second device may act as a device, from the random access point of view. In other words, the first device transmits random access signal(s) and the second device may respond with random access response(s).

The term "resource" is used in the following discussion and refers to any one of a time, frequency, code, sequence, or space resource, or any combination thereof.

The random access procedure in traditional cellular systems is briefly described here as a reference based on the assumption of a successful random access. Such a random access procedure generally involves the following steps or processes:

1. Different nodes corresponding to cells in the network transmit different reference signals (RS) and system information. The cell-specific system information includes a random access configuration. The random access configuration includes:
    (a) A random access signal (RAS) configuration, specifying the allowed RAS resources (time, frequency, sequence, code, etc).
    (b) A random access response (RAR) configuration, specifying a set of RAR resources, defined in relation to a selected RAS resource, on which a device can expect a RAR.
2. A device measures the RS of adjacent cells.
3. The device receives system information of adjacent cells.
4. The device selects which cell to try to connect to, for instance based on the RS measurements.
5. The device selects a RAS resource and a RAS transmit power based on the RAS configuration of the selected cell.
6. The device transmits the RAS on the selected resource using the selected transmit power.

7. The RAS is received and detected by a node of the selected cell.

8. The node selects a resource from the set of RAR resources specified in the RAR configuration.

9. The node transmits the RAR on the selected resource.

10. The device receives the RAR, which contains information used to proceed with the communication between the UE and the node.

If the device does not receive a RAR, it may choose to re-transmit a RAS with higher power. (i.e. return to step 5).

In another example, the steps specified above may be used in LTE, as follows:

1. Different eNodeBs corresponding to cells in the network transmit different PSS/SSS, CRS and system information (MIBs and SIBs). The cell-specific system information includes a random access configuration. The random access configuration includes:
   (a) A RAS configuration, specifying the allowed RAS resources (time, frequency, sequence, code, etc).
   (b) A RAR configuration, specifying a set of RAR resources, defined in relation to a selected RAS resource, on which a UE can expect a RAR.
2. A UE measures the RS of adjacent cells.
3. The UE receives system information of adjacent cells.
4. The UE selects which cell to try to connect to based on the RS measurements.
5. The UE selects a RAS resource and a RAS transmit power based on the RAS configuration of the selected cell.
6. The UE transmits the RAS on the selected RAS resource using the selected transmit power.
7. The RAS is received and detected by a node of the selected cell.
8. The node selects a resource from the set of RAR resources specified in the RAR configuration.
9. The node transmits the RAR using the selected resource.
10. The UE receives the RAR, which includes information used to proceed with the communication between the UE and the node.

The order of the steps above may vary in various implementations. Also, for each time a random access is performed, one or more steps may be omitted.

Figure 1:
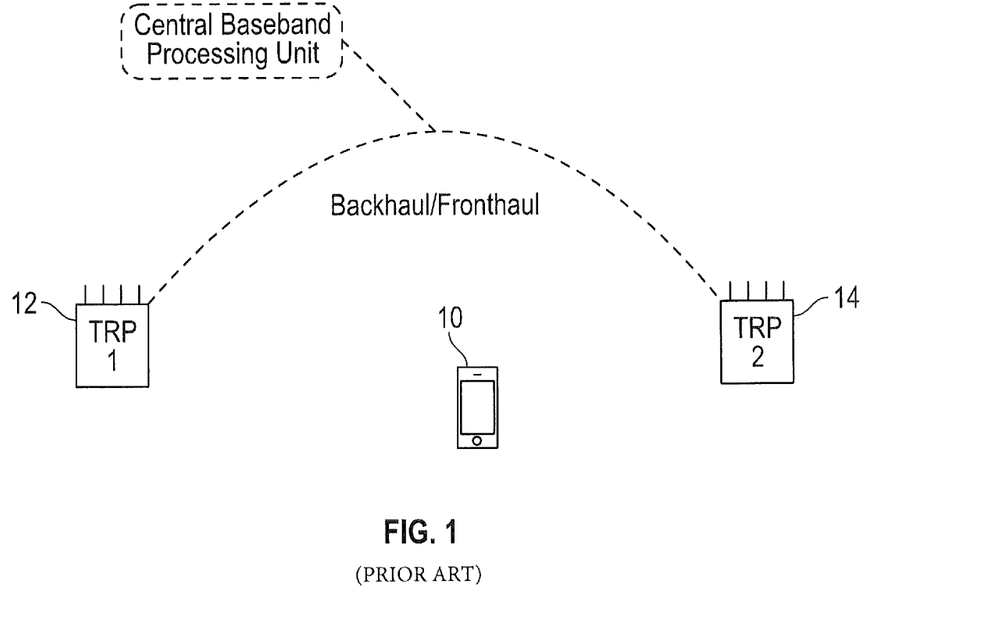
FIG. 1 illustrates a diagram of a mobile device near two TRPs which are connected with a backhaul and/or fronthaul.

Various scenarios can be described in relation to FIG. 1. A device 10 is in an area with one or more TRPs (two TRPs 12 and 14 are shown in the figure). The TRPs 12 and 14 are connected with backhaul/fronthaul components or resources (not shown), which may be wired or wireless connections, or a combination thereof, in one or more hops (links). In some scenarios, some or all of the processing related to random access is performed in a central baseband processing unit, connected to the TRPs 12 and 14 through the backhaul/fronthaul resources. Note that the central baseband processing unit may be co-located with a TRP in some scenarios. The term backhaul is often used when the processing is done mainly in the TRPs (i.e., in the "back" of the processing). The term fronthaul is often used when the processing is done mainly in the central unit (in "front" of the processing). The performance of the backhaul/fronthaul link(s), e.g. in terms of data rate, latency, reliability, may vary greatly in various scenarios.

Figure 2:
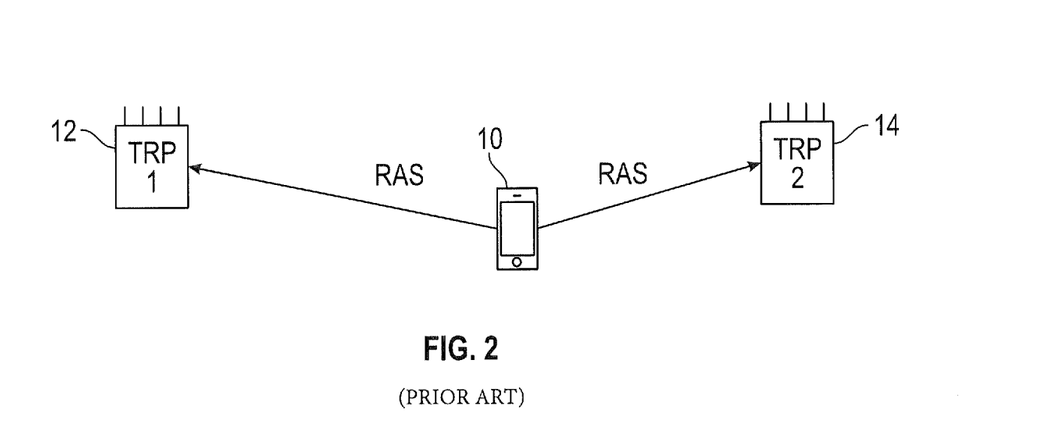
FIG. 2 illustrates a diagram of a mobile device that transmits a random access signal (RAS), which is received by two geographically separated TRPs.

In FIG. 2, the device 10 transmits a random access signal (RAS) that is received by the two nearby TRPs 12 and 14. Whether or not a RAS received at a TRP can be correctly detected depends on many factors such as, for example, the RAS transmit power, the radio propagation conditions between the device and the TRP, the interference at the TRP, the TRP beamforming and processing gain and whether or not the TRP is configured to detect RASs on the resources which the device used for the RAS transmission.

Figure 3:
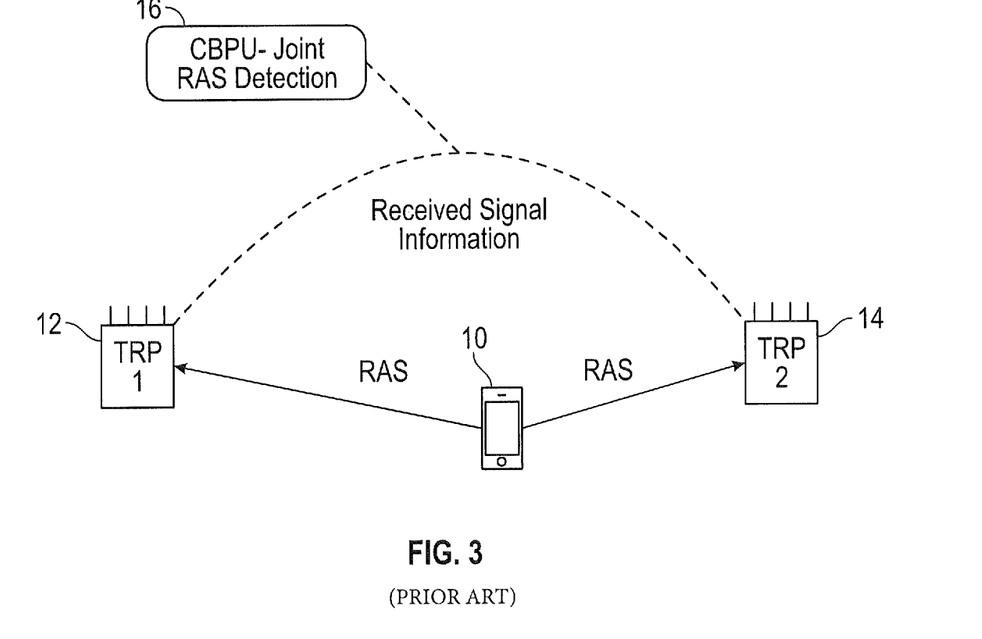
FIG. 3 illustrates a scenario wherein joint RAS detection is performed in a central baseband processing unit based on signal information received from the different TRPs over the fronthaul.

In some scenarios, the signals received at both TRPs 12 and 14 can be used to perform a joint RAS detection at a central baseband processing unit 16, as illustrated in FIG. 3. The joint detection is based on information received from the different TRPs over the fronthaul. In some embodiments, the received RAS can be more or less pre-processed at a TRP before being sent to the central baseband processing unit for final detection. In one extreme, the raw received signal is directly forwarded to the central unit 16 over the fronthaul, which requires a high-capacity fronthaul. On the other extreme, the received signal is highly processed, for instance into a single decision variable, before being sent to the central unit 16, which only requires a low-capacity fronthaul. Different TRPs may process the received RAS differently.

Figure 4:
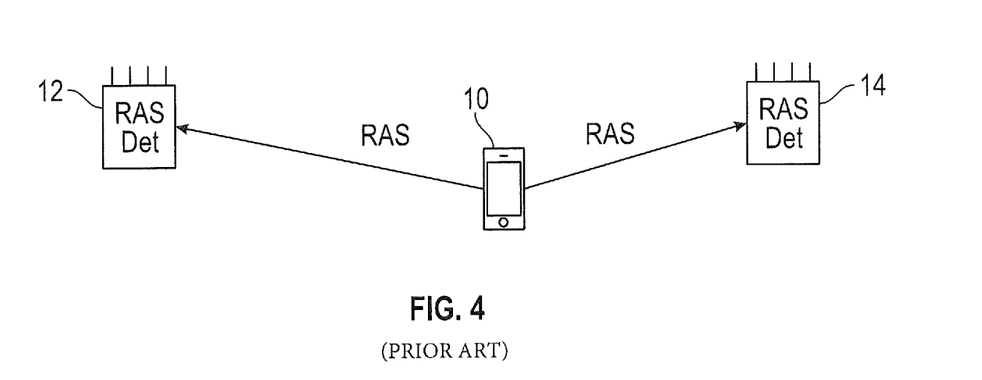
FIG. 4 illustrates a scenario wherein the TRPs of FIG. 2 separately perform RAS detection without exchanging information with each other.
Figure 5:
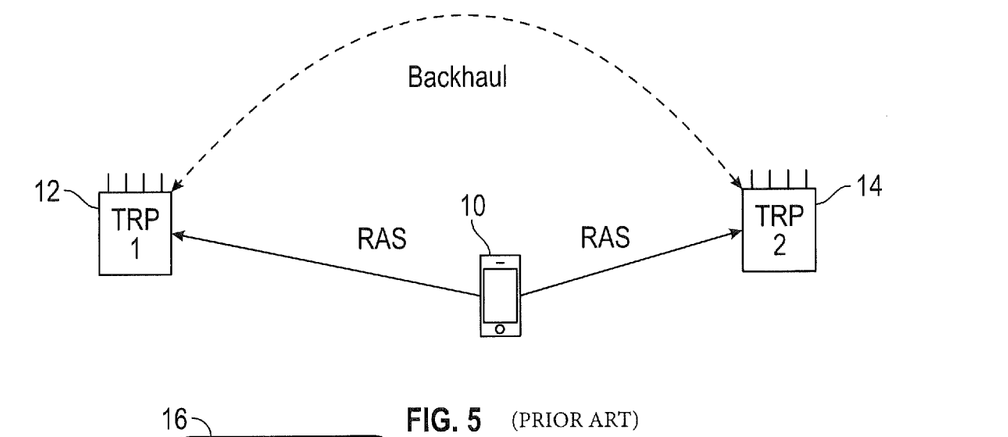
FIG. 5 illustrates a scenario wherein RAS detection is performed in a distributed manner in which information is exchanged between the TRPs over a backhaul.

In some scenarios, each TRP 12 and 14 performs RAS detection separately, based on the signal received at each TRP, as illustrated in FIG. 4. In some scenarios, a distributed algorithm is used to detect a RAS as shown in FIG. 5. A distributed algorithm involves some information exchange between the TRPs 12 and 14 over a backhaul. In some cases, the detection decision can be made in multiple TRPs. In some embodiments, the decision can be made in one TRP. A distinction to a centralized joint detection is that the information flow in the centralized approach is from the TRPs to the central baseband processing unit. While using a distributed algorithm, the information exchange is often bi-directional, and in some alternative embodiments, plural information exchange iterations may occur.

In some embodiments, a TRP is a complete base station, as in the examples shown in FIGS. 4 and 5, since the processing is distributed in the TRPs, i.e. not performed in a central processing unit. However, in other embodiments, for instance as illustrated in FIG. 3, a TRP implements only some parts of traditional base station functions. As such, the TRP may be only an antenna, or an antenna with basic processing capabilities, with most "base-station processing" being performed elsewhere, for instance, in a central processing unit, perhaps located quite far from the TRP.

As described above, devices can in some cases be said to be a part of the "network" for instance when they act as relays between other devices and TRPs. The TRPs considered here are all part of the same network. Each TRP may correspond to a cell, in accordance with some embodiments. In a 5G network, for example, there may be no area-bound cells between which a UE/device is handed over. Instead, a UE/device may just continue communication with an abstract/logical entity "node" (sometimes also called a "virtual cell"), even though the device/UE moves over a large area. Hence, this abstract/logical entity "node" may move from TRP to TRP or from a group of TRPs to another group of TRPs as the device/UE moves through the network.

After transmitting a RAS, a device expects a response in the form of a RAR. Upon the detection of a RAS, the network should respond with a RAR. Different approaches to transmit and coordinate RARs are discussed below. A RAR is typically transmitted by one or more TRPs (it could also be relayed/transmitted by "devices acting as TRPs"). Since the TRPs constitute parts of the network, in some embodiments, a RAR may be referred to as being transmitted by the network.

Figure 6:
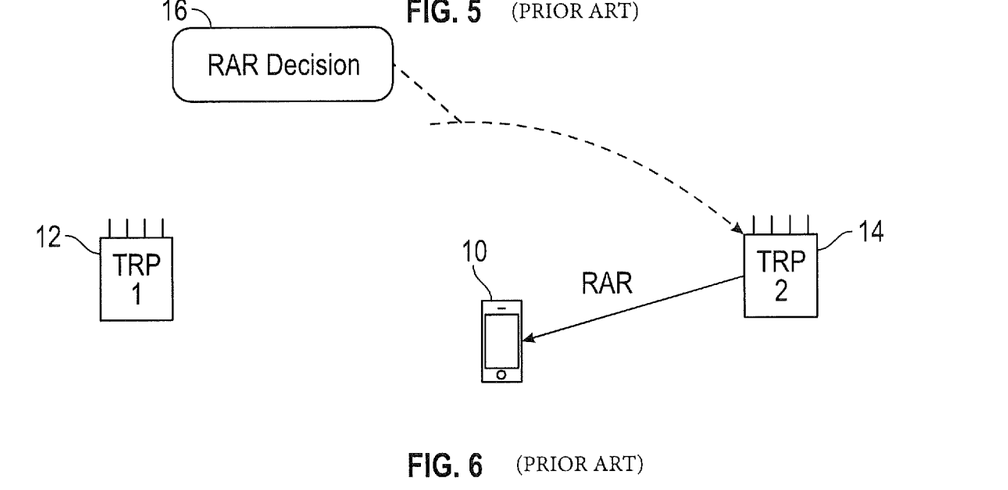
FIG. 6 illustrates a scenario wherein the RAR content and transmission details are determined by a central baseband processing unit, which determined that TRP 14 should transmit the RAR to the mobile device.

In some scenarios, such as with centralized joint RAS detection, the RAR transmission from the TRPs can be coordinated, as illustrated in FIG. 6. This means that the network can make sure that only a single RAR is transmitted, albeit possibly jointly from multiple TRPs. The central unit can decide the content of the RAR as well as the transmission details, such as the time-frequency resources to be used.

Note that the RAR may be coordinated to various extents in some scenarios with distributed RAS detection and separate RAS detection. Whether or not the RAR may be coordinated depends on, for example the performance of the backhaul and on the structure of the algorithms, the protocols and the system architecture. A low-performance backhaul, e.g. with long delay, may prohibit RAR coordination. Slow algorithms and low required delay between RAS detection and RAR transmission by the protocol may also prohibit RAR coordination.

Figure 7:
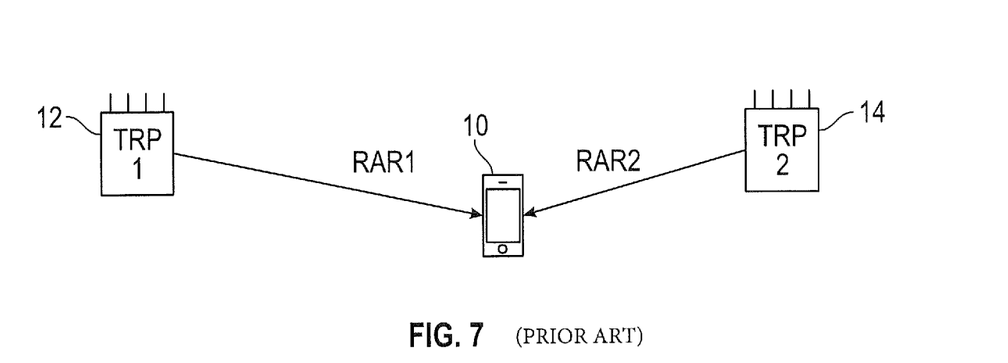
FIG. 7 illustrates a scenario wherein the different TRPs transmit RARs without coordination with each other, wherein different RARs may have different content and use different time-frequency resources.

In some scenarios, such as with some cases with separate or distributed RAS detection, the RAR transmission is not coordinated. This means that a TRP that detects a RAS may transmit a RAR without coordinating with other TRPs. Hence, if multiple TRPs detect a RAS, multiple different RARs may be transmitted to the device, as illustrated in FIG. 7. The content of the different RARs transmitted by different TRPs may be different and the time-frequency resources and other transmission parameters (codes, scrambling sequences, identities etc.) may also be different.

RAR coordination here generally refers to the dynamic coordination after the detection of a particular RAS. Even though multiple TRPs may not coordinate the RAR transmission following a RAS detection, they may advantageously coordinate the random access, and RAR transmission, in other ways, typically on a semi-static time-scale, which may be an order of magnitude or more longer than the time-scale of a RAS and a corresponding RAR. In some embodiments below, we refer to dynamic RAR coordination and semi-static RAR coordination. If not specified, we refer to dynamic RAR coordination.

In LTE and UMTS, the UE expects a single RAR (in UMTS, it's called AICH). In LTE, the UE expects a RAR within a certain configurable time-window, in relation to the RAS (PRACH) transmission time, here called the RAR window. A UE that receives and correctly decodes a RAR in the RAR window may interrupt any further attempts to receive and decode RAR. Hence, in LTE, it can be expected that a UE receives and successfully decodes only a single RAR, typically the one transmitted first. Consequently, in the scenario with multiple uncoordinated RARs, the UE typically responds to the first successfully received RAR. The UE continues communication with the TRP that happened to transmit the first RAR the UE correctly decoded, which typically is the first RAR that was transmitted.

Figure 8:
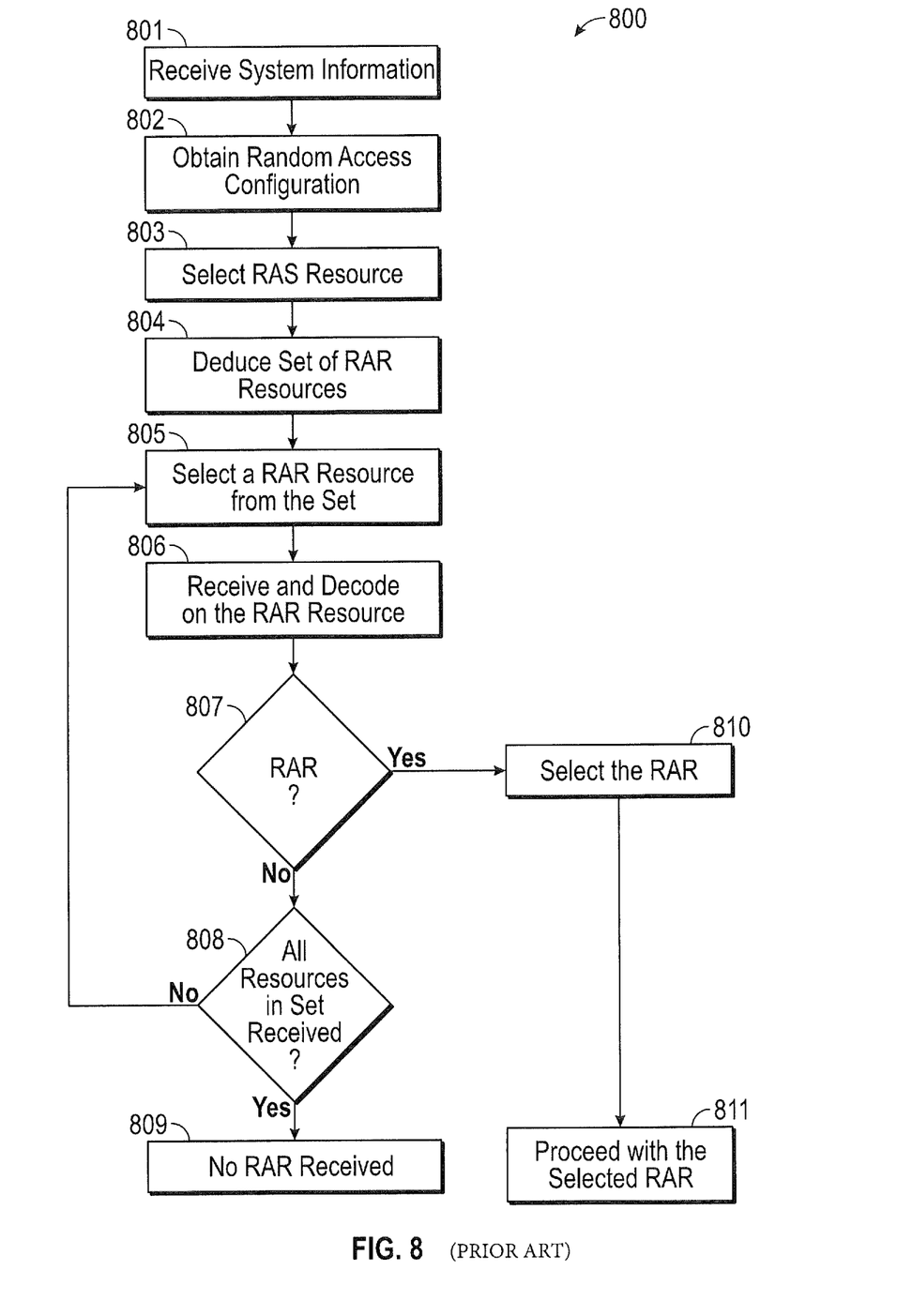
FIG. 8 illustrates a flowchart generally describing a device procedure for initial access with signal RAR reception.

FIG. 8 shows a flowchart of the steps that roughly constitute the first part of initial access with single RAR reception, such as in LTE. At step 801, the device receives (and correctly decodes) system information. Next, at step 802, the device obtains a random access configuration, which in many cases is included in the system information. The random access configuration may include: (a) the RAS configuration, which may include a set of resources that a device may use to transmit a RAS and/or a RAS transmit power configuration; and/or (b) the RAR configuration, which may include instructions on how the device should attempt receive and decode a RAR, e.g. instructions on how a device should derive the resources used for RAR (the RAR resources) based on which RAS resource the device selected. In LTE, for example, the RAR configuration includes the RAR window.

Next, at step 803, the device selects which RAS resource to use and/or which transmit power to use for the RAS. The RAS may be transmitted after this step, or alternatively after steps 804 or 805 described below. Based on the selected RAS resource, at step 804, the device deduces the set of RAR resources. Next, at step 805, the device selects a RAR resource from the set, which has not yet been received and decoded. If different RAR resources are distributed in time, the RAR resources first in time need to be received before the RAR resources that follow in time. If the different RAR resources are simultaneous and separated by different sequences for instance, then the device may select any of the simultaneous RAR resources to receive and decode first.

At step 806, the device receives the selected RAR resource and attempts to decode a RAR. At step 807, the device determines if a RAR was successfully decoded. If not, at step 808, the device determines whether all RAR resources have been received. If all RAR resources in the set have been received without a successful RAR decoding, then at step 809, the device concludes that no RAR was received following the RAS transmission and terminates the RAR reception procedure as a failure. If at step 808, it is determined that all RAR resources have not been received, the process 800 returns to step 805 and proceeds as discussed above.

If that step 807, it is determined that a RAR has been decoded, then at step 810, the device selects the correctly decoded RAR. Next, at step 811, the device uses the information in the selected RAR to proceed with the communication, in which case the random access procedure has been so far successful. If the random access procedure failed, e.g. the device ended up at step 809, in some cases, the device may choose to restart the procedure, e.g. from step 3, possibly with a higher RAS transmit power.

In UMTS, the device expects a RAR (called AICH in UMTS) in a certain time instance, i.e. the RAR window has a single transmission opportunity. The AICH, however, is merely an acknowledgement of a received RAS, and contains no further information. Hence, in the scenario with multiple uncoordinated RARs (AICHs), the RARs (AICHs) from the different TRPs will be received at roughly the same time, as a single RAR (AICH) from the device perspective. The conflict of the multiple uncoordinated TRPs is not resolved at this stage.

In the initial access approach, a device may expect to receive multiple RARs. In other words, it does not stop receiving and decoding RAR after the first successfully decoded RAR. Instead, the device proceeds with reception and decoding on all defined RAR resources, for instance during the whole RAR window. After the reception of multiple RARs, the device selects which RAR to continue communication with. The selection can be based on measurements on the RAR, the RAR contents or other parameters.

Figure 9:
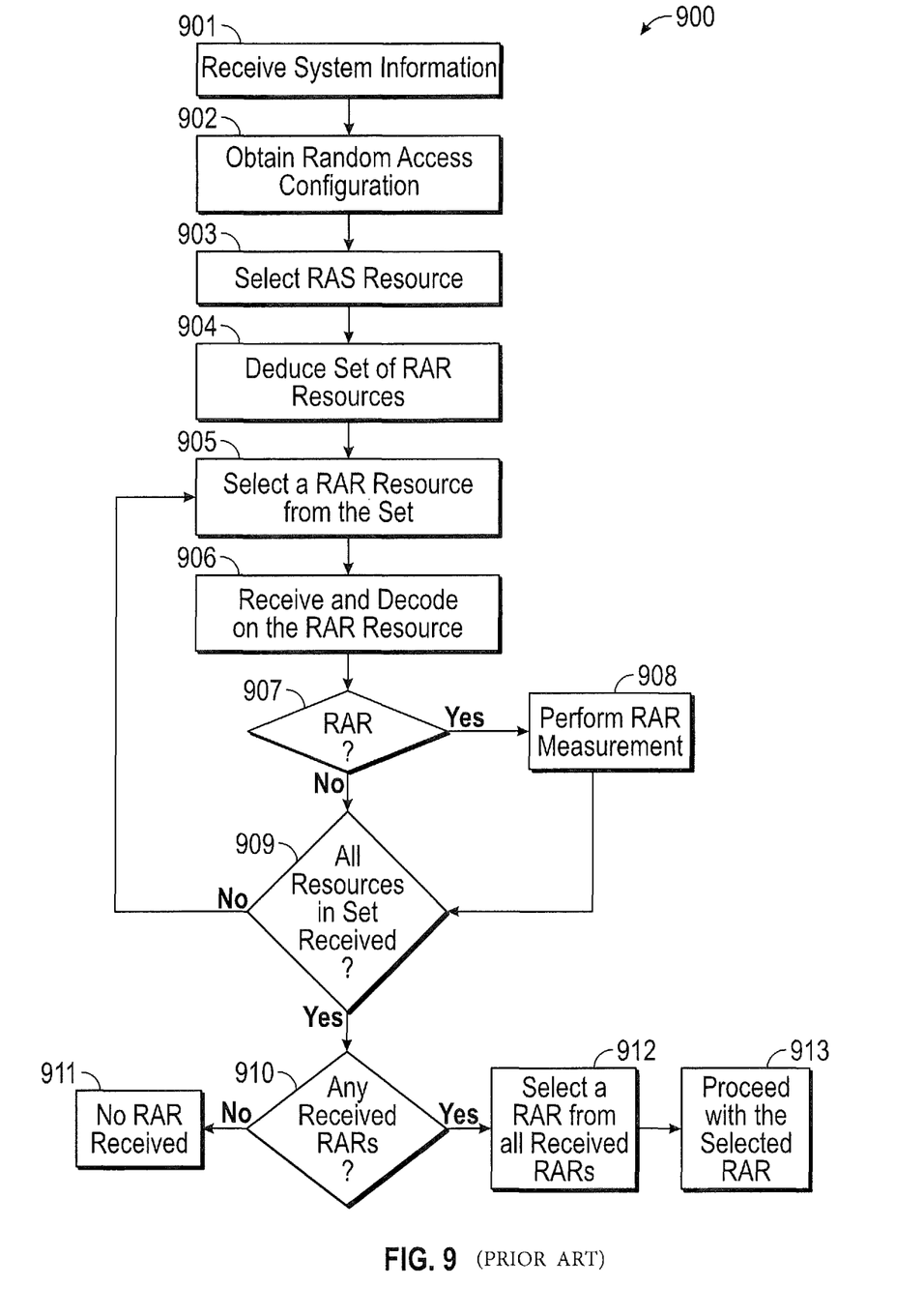
FIG. 9 illustrates a flowchart generally describing a device procedure for initial access with multiple RAR reception.

FIG. 9 illustrates an exemplary process 900 of selecting a RAR to continue communications after reception of multiple RARs, as discussed above. Steps 901-907 are the same as steps 801-807, respectively, of FIG. 8 described above. Therefore, the description of steps 901-907 are not repeated here. If a RAR has been successfully decoded at step 907, the process 900 proceeds to step 908, where the device performs one or measurements on the received and decoded RAR. Next, at step 909, the device determines if all RAR resources have been received. If not, the process 900 returns to step 905 and proceeds anew from there. If all RAR resources have been received, at step 910, the device determines whether it has successfully received and decoded any RARs. If not, at step 911, the device concludes that no RAR was received following the RAS transmission and terminates the RAR reception procedure as a failure. If at step 910, it is determined that one or more RARs were successfully received and decoded, at step 912, the device selects a RAR from the set of successfully received and decoded RARs based on the measurements made at step 908. Next, at step 913, the device uses the information in the selected RAR to proceed with the communications, in which case the random access procedure is deemed successful.

If the random access failed, e.g. the device ended up in step 911, the device may choose to restart the procedure, e.g. from step 3, possibly with higher RAS transmit power.

In a scenario with coordinated TRPs, single RAR reception has the following benefits: reduced device power consumption, since the device can interrupt RAR reception and decoding after the first successfully decoded RAR; faster setup of communication, since the device does not have to wait until the end of the RAR window until an RAR is selected and communication can continue. In a scenario with uncoordinated TRPs, multiple RAR reception has benefits. For example, the device can directly select the most suitable TRP and further conflict resolution between TRPs is not needed.

On the other hand, in a scenario with coordinated TRPs, the multiple RAR reception has drawbacks as follows: increased device power consumption, since the device cannot interrupt RAR reception and decoding after the first successfully decoded RAR; slower setup of communication, since the device has to wait until the end of the RAR window until a RAR is selected and communication can continue. In a scenario with uncoordinated TRPs, the single RAR reception has drawbacks as follows: the device cannot select the most suitable TRP. Instead, the TRP selection is based on unsuitable criteria, such as which TRP that first transmitted a RAR.

In next generation wireless communication systems, the scenario with coordinated TRPs may well be mixed with the uncoordinated TRP scenario. For instance, one area may be covered by a set of TRPs which can coordinate their RARs, while an adjacent area is covered by a set of TRPs which cannot coordinate their RARs. To address this scenario, the disclosed invention provides dynamic termination of RAR reception, which is discussed in detail below in accordance with various embodiments.

SUMMARY OF INVENTION

Various exemplary embodiments are described below that provide various general approaches to address the above-identified problem. In further embodiments, the invention can include the combination of features from two or more embodiments described herein while remaining within the scope of the present disclosure.

Various embodiments of the invention address the problem of random access response (RAR) reception and decoding termination by a device. In traditional cellular systems, a device terminates RAR reception and decoding after a first successfully received RAR. In future wireless communication systems, it may be necessary that a device receives multiple RARs.

By allowing a dynamic use of either single RAR reception or multiple RAR reception, the device energy efficiency and latency performance can be improved. Several approaches are proposed. By introducing a priority indicator in the RAR message, the network can control the termination in the device. Another approach is to allow a device to terminate the RAR reception and decoding based on the content of the received RARs. In a third approach, the network can set the termination method semi-statically, for example, in a system information or in a dedicated RRC configuration.

The following abbreviations or acronyms are used in the present disclosure:

| Abbreviation | Description |
| --- | --- |
| AICH | Acquisition Indicator Channel (UMTS) |
| AIT | Access Information Table |
| CRS | Common Reference Symbols (LTE) |
| DAS | Distributed Antenna System |
| MIB | Master Information Block (LTE) |
| PRACH | Physical Random Access Channel (LTE) |
| PSS | Primary Synchronization Signal (LTE) |
| RRU | Remote Radio Unit |
| RS | Reference Signal |
| SIB | System Information Block (LTE) |
| SSI | System Signature Index |
| SSS | Secondary Synchronization Signal (LTE) |
| TRP | Transmission and Reception Point |
| UE | User Equipment |

BRIEF DESCRIPTION OF THE DRAWINGS

Aspects of the present disclosure are best understood from the following detailed description when read with the accompanying figures. It is noted that various features are not necessarily drawn to scale. In fact, the dimensions of the various features may be arbitrarily increased or reduced for clarity of discussion.

DETAILED DESCRIPTION OF EXEMPLARY EMBODIMENTS

In some areas (i.e. device locations and orientations in space), using single RAR reception may be more suitable. While in other areas, using multiple RAR reception may be more suitable. To enable the simultaneous and dynamic use of the different reception methods in different areas and in different time instants, some embodiments include using a priority indicator in a RAR message. In some embodiments, the indicator is binary while in some other embodiments, the indicator may have more than 2 levels. In some embodiments, a priority indicator indicates whether a device's reception of RARs may be terminated, i.e. no more RARs need to be decoded. If the indicator is binary (i.e., two values), one value may indicate termination and the other value may indicate continued RAR reception and decoding. In some embodiments, if the indicator is non-binary, a value above/below a certain threshold level would indicate continued RAR reception, while other values would indicate termination. Such a threshold level could be defined in the random access configuration, in some embodiments. In some embodiments, the termination decision would be based on a priority indicator together with other parameters, e.g. the RAR content or device or service parameters as described below.

In various embodiments, one or more priority indicator values may be used to inform the device to retransmit the RAS, even though a RAR is received. In some embodiments, such values would also indicate RAR reception termination. In some embodiments, a RAR may also include further information on the RAS retransmission, such as transmit power and/or which RAS resource to use. In some embodiments, such further information may be provided implicitly by the value of the priority indicator.

A variety of advantages may be provided by using such an RAR priority indicator. In an example, using a RAR priority indicator provides a way for the network to control or influence the termination of RAR reception at the device side, in various embodiments, with low overhead. This is further described below under the discussion section of network side embodiments.

Figure 10:
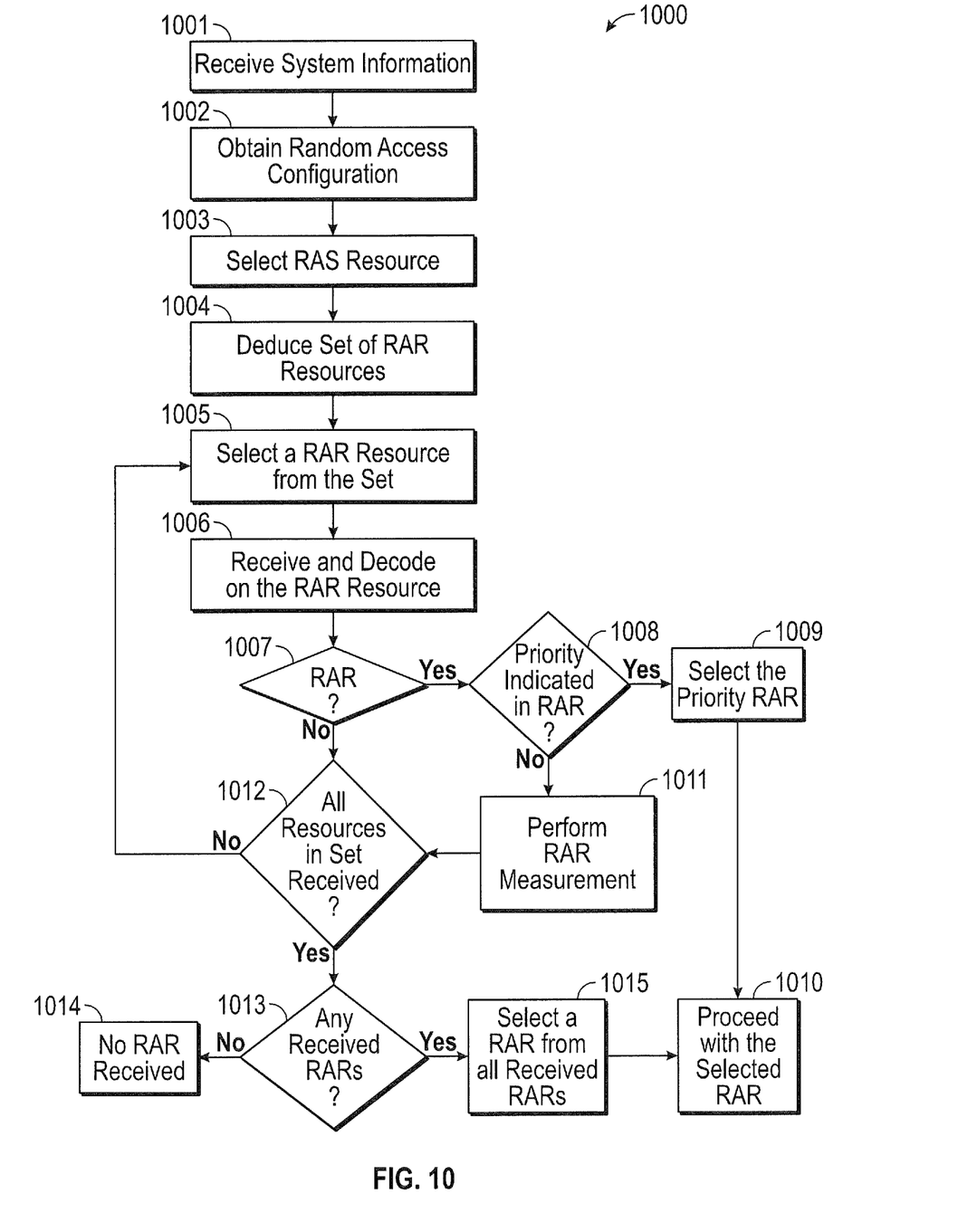
FIG. 10 illustrates a flowchart generally describing a device procedure wherein a RAR may contain a priority indicator, which terminates the device's reception and decoding of additional RARs, and the device thereafter uses the RAR containing the priority indicator for forthcoming communications, in accordance with various embodiments of the invention.

In some embodiments, termination by a priority indicator means that the terminating RAR should be selected for the forthcoming communication. FIG. 10 illustrates a process 1000 of terminating further RAR reception based on a received priority indicator, in accordance with various embodiments. Steps 1001-1007 of process 1000 are the same as steps 801-807 of process 800 described in connection with FIG. 8 above. Therefore, the description of steps 1001-1007 is not repeated here. If at step 1007, a RAR was successfully received and decoded, at step 1008, the device determines whether the decoded RAR includes a priority indicator. If the RAR includes a priority indicator (or the priority indicator has a value indicating termination of further RAR reception), at step 1009, the RAR with priority indicator (or priority indicator having a predetermined value) is selected, which terminates further reception of RARs. Next, at step 1010, the device proceeds with further communications using the selected RAR.

On the other hand, if at step 1008, it is determined that the decoded RAR does not contain a priority indicator (or, in some embodiments, the value of the priority indicator does not indicate termination of further RAR reception), the process 1000 moves to step 1011 wherein the device performs a measurement on the RAR and/or extracts the RAR content on the received and decoded RAR. Next, at step 1012, the device determines if all RAR resources in a set have been received. If not, then the process 1000 reverts back to step 1005 and proceeds anew from there. If at step 1012, it is determined that all RAR resources have been received and decoded, at step 1013, the device determines if any RARs were successfully received and decoded. If no RARs have been successfully received and decoded, at step 1014, the device concludes that no RAR was received following the RAS transmission and terminates the RAR reception procedure as a failure. However, if it is determined that one or more RARs were successfully received and decoded at step 1013, at step 1015, the device selects a RAR from the set of successfully received and decoded RARs based on the RAR measurement(s) and/or content of the received RARs. Various embodiments of selecting a RAR are described in further detail below. After step 1015 is completed, the process 1000 proceeds to step 1010 wherein the device uses the information in the selected RAR to proceed with the communication, in which case the random access procedure was successful.

In some embodiments, the information received at step 1001 may include an Access Information Table (AIT), with one or more entries containing access information. In various embodiments of step 1002, the obtaining a random access configuration may include measurements on System Signature Indices (SSI), RSs or synchronization signals, and the selection of an entry in the AIT based on the measurement results, where the entry includes a random access configuration.

Figure 11:
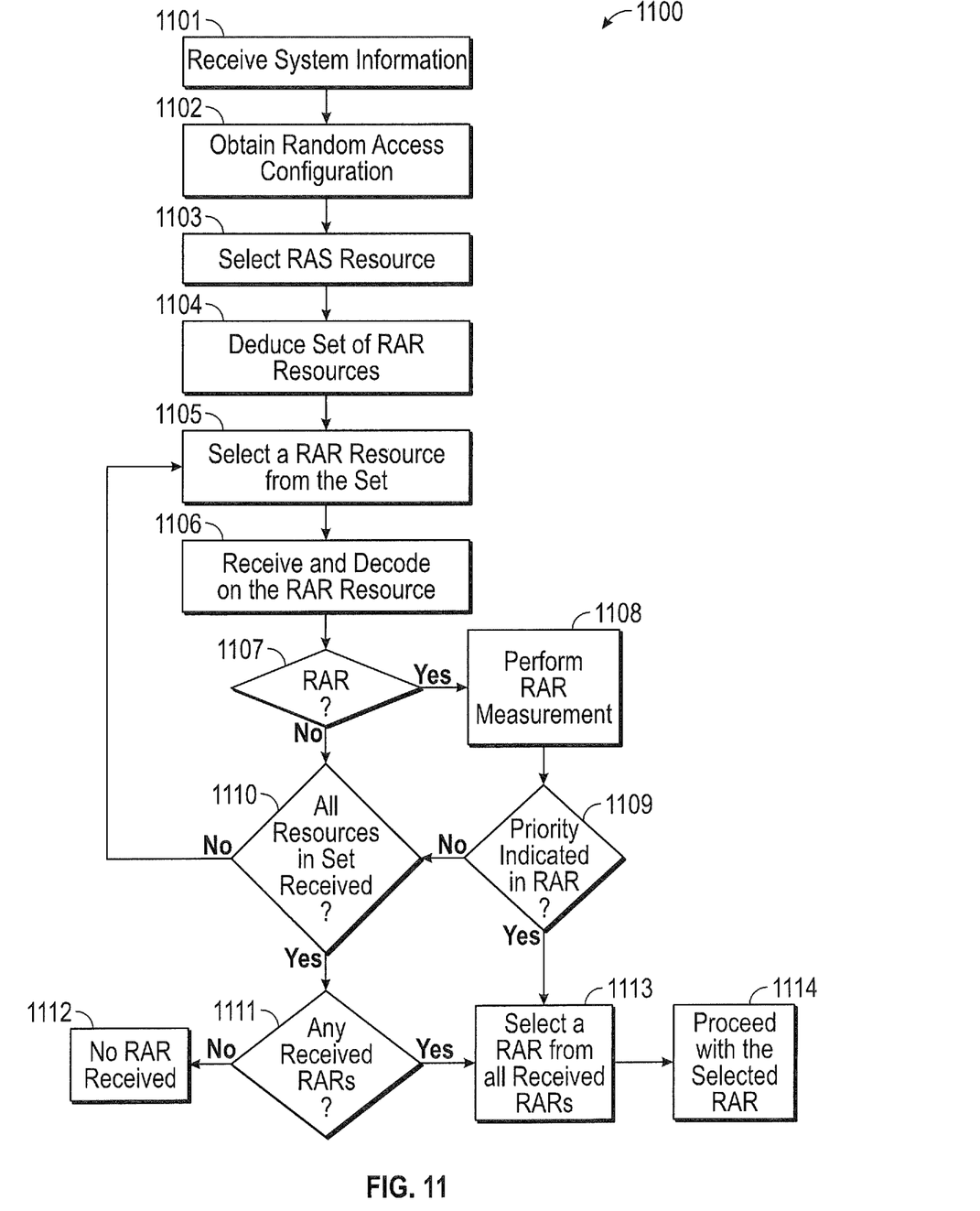
FIG. 11 illustrates a flowchart generally describing another device procedure wherein a RAR may contain a priority indicator, which terminates the device's reception and decoding of additional RARs, and the device thereafter uses the RAR containing the priority indicator for forthcoming communications, in accordance with various embodiments of the invention.

In some embodiments, termination using a priority indicator suggests that one of the already received and decoded RARs, including the RAR which includes the terminating priority indicator, should be selected for the forthcoming communication, as illustrated in FIG. 11.

FIG. 11 illustrates an alternative process 1100 wherein a priority indicator in a decoded RAR terminates further RAR reception and decoding, but the device still selects a RAR from all received RARs so far. Steps 1101-1107 of FIG. 11 are the same as steps 801-807 of FIG. 8 described above. Therefore, the description of steps 1101-1107 is not repeated here. If a RAR is successfully received and decoded at step 1107, then at step 1108, the device performs measurements and/or extracts content from the decoded RAR. Next, at step 1109, it is determined whether a priority indicator having a value that satisfies a predetermined criteria, which terminates further reception of RARs, is contained in the decoded RAR. If no priority indicator is found in the decoded RAR, the process 1100 moves to step 1110, which is the same as step 1012 described above. Step 1111 is the same as step 1013 described above. Step 1112 is the same as step 1014 described above. Step 1113 is the same as step 1015 described above, and step 1114 is the same as step 1010 described above. Therefore, the description of steps 1110, 1111, 1112, 1113 and 1114 are not repeated here. If at step 1109, it is determined that a priority indicator is contained in the decoded RAR, the process moves to step 1113 and proceeds from there.

To summarize the differences between the processes shown in FIGS. 10 and 11, in FIG. 10, the RAR that includes the priority indicator is selected while in FIG. 11, one of the so-far received and decoded RARs is selected based on measurements and/or content of the received RARs. In both FIGS. 10 and 11, the RAR reception and decoding will be terminated based on detection of a priority indicator in a decoded RAR. The difference between FIGS. 10 and 11 is how a RAR is selected for further communication. The reason the measurement is performed on the RAR with a priority indicator in FIG. 11 (step 1108), is that the RAR selection in step 1113 is based on RAR measurement. In FIG. 10, it is not needed to perform a measurement on the RAR with a priority indicator, since the RAR with a priority indicator is always selected, regardless of any measurement results. In some embodiments, to determine which RAR to proceed with (steps 1113-1114 in FIG. 11), the RAR with a priority indicator having the highest value is selected. In other embodiments, the RAR is selected based on the value of the priority indicator and/or the RAR measurement (step 1108 of FIG. 11) and/or other RAR content. Any one of these parameters, or combination of two or more of these parameters (i.e., priority indicator, the RAR measurement results and other RAR content) may be utilized to select which RAR to proceed with for further communications, in accordance with various embodiments of the invention.

In various embodiments, the decision to include a priority indicator (indicating RAR reception and decoding termination) in an RAR transmitted by a TRP is based on the level of RAR coordination that is possible between the TRPs in the area (see discussion above on RAR coordination).

In various embodiments, if a set of TRPs in an area have a high level of coordination, e.g. due to centralized processing, such that their RARs may be coordinated, then a priority indicator may be included in a RAR transmitted by the set of TRPs so that a device may terminate its RAR reception and decoding upon its reception. In other words, in an area where single RAR reception is suitable, terminating priority indicators are included in RARs.

In various embodiments, if a set of TRPs in an area have a low level of coordination, e.g. due to separate or distributed processing and/or high-latency backhaul, such that their RARs may not be coordinated, then a priority indicator is not included in a RAR, so that a device may not prematurely terminate its RAR reception and decoding. In such embodiments, multiple RAR reception may be used. In various embodiments, when a device receives multiple RARs and has not terminated the reception and decoding, the device may choose which RAR to proceed communication with. In other words, TRP selection is not done in advance by the network, which is the case when a single RAR reception is indicated, but by the device after multiple RARs are received, in accordance with various embodiments. Thus, multiple RAR reception is advantageous if a device decides which RAR to respond to.

In various embodiments, when RARs are not coordinated, a TRP may still choose to include a priority indicator in a RAR. In such embodiments, the priority indicator is given a value that indicates termination of RAR reception and decoding at the device. In some embodiments, a TRP includes a terminating priority indicator if it has excess capacity, in terms of radio, backhaul/fronthaul, processing and/or storage resources, or a combination thereof. In some embodiments, a network or a part of a network of TRPs and/or other processing entities semi-statically coordinate the RARs. The result of such a coordination may be that one or more TRPs include terminating priority indicators in the RARs, in accordance with some embodiments, even though the TRPs have not coordinated RARs dynamically, i.e. based on RAS detection results. In some embodiments, a TRP includes a terminating priority indicator in a RAR based on one or more measurements and estimated parameters of the corresponding RAS, for example, the RAS received power, the RAS resource or resource index, the estimated time/frequency/Doppler parameters of the received RAS. In some embodiments, the value of the priority indicator can depend on the RAS received power. For example, a priority indicator value of 1 indicates that the RAS received power is very low relative to a predetermined threshold value; a priority indicator value of 2 indicates that the RAS received power is low relative to the predetermined threshold; while a priority indicator value of 3 indicates that the RAS received power is higher than the threshold value. In some embodiments, a priority indicator value of 3 also indicates termination of further RAR reception.

In some embodiments, when the device's selection of RAS resources or parameters indicates service requirements, service type, or other device-side communication parameters, a TRP may include a terminating priority indicator based on the information conveyed by the detected RAS resources or parameters. For instance, the RAS resource or parameters indicate QoS requirements for the service initiating the random access in the device, in various embodiments. If a TRP detected that the RAS supports such QoS requirements, it may include a priority indicator with a certain value, in some cases a value that would terminate RAS reception and decoding. If a TRP does not support such QoS requirements, it may include a priority indicator with another value, in some cases a value that would not terminate RAS reception and decoding. Hence, even with non-coordinating TRPs, a device could receive multiple RARs from TRPs that do not fully support the requested QoS. A RAR from a TRP that can support the requested QoS level can terminate the RAR reception with its priority indicator. If the RAR was the first received and decoded, that would result in a single RAR reception, even without the coordination.

The decision to include a priority indicator in a RAR (and its value(s)) is made by a TRP, in some embodiments. In some embodiments, the decision is made by a centralized baseband processing unit. In some combinations, the decision is made using a distributed algorithm, involving multiple processing units and/or TRPs and/or other network elements and involving exchange of information/parameters over backhaul or fronthaul. In some embodiments, the decision to include a priority indicator is made based on semi-static coordination between units/TRPs/elements. In some embodiments, the decision to include a priority indicator is made dynamically based on dynamic parameters, such as local measurements, local performance indicators, as also described above.

Note that the context here is one instance of the random access procedure, i.e. corresponding to the procedure related to the transmission of one RAS. If the device at a later time transmits a RAS again, the previous termination of RAR reception and decoding, corresponding to a previous RAS transmission, is no longer valid. For a device performing multiple random access procedures, it may skip steps 1001/1101 and 1002/1102 above (receive system information and obtain random access configuration), if it already obtained a random access configuration in connection with a previous random access.

In some areas, using single RAR reception may be more suitable. While in other areas, using multiple RAR reception may be more suitable. To enable the simultaneous and dynamic use of the different reception methods in different areas and in different time instants, some embodiments let a device terminate RAR reception and decoding based on the content of one or more successfully decoded RARs. In such embodiments, RAR content other than a priority indicator is considered.

A variety of advantages may be provided by enabling a device to terminate the RAR reception based on RAR content inspection. In one example, using the RAR content inspection, a matching (during the RAR selection stage) between more specific device requirements and the capabilities of the nodes and TRPs transmitting the different RARs may be facilitated. Thus, the delay between RAS transmission and fully operational subsequent data communication can be improved. However, the inclusion of extensive content in RARs may be costly in terms of overhead during the random access procedure. Hence, an appropriate trade off should be found based on desired performance results.

In various embodiments, a RAR includes various information, such as one or more of the following characteristics of the transmitting TRP Processing, storage and/or related capabilities, Radio, backhaul/fronthaul, processing and/or storage load, Offered/supported QoS, e.g. in terms of latency, throughput and/or reliability, such as offered/supported combinations of latency, throughput and reliability, Supported frequency bands, Supported network slices, Supported modes of communication, e.g. modes for vehicular communication, massive machine-type (internet of things) communication, mission-critical machine-type communication, extreme mobile broadband communication, high-speed communication, energy efficient communication, long-range communication, communication compatible with satellite or other aerial-based communication, factory or automation communication, secure communication, e-health communication, smart grid communication, etc. A mode of communication may be specified in a RAR either by explicit indication of a mode, for instance from the list above, in various embodiments, or by specification of a number of configurations. A mode of communication may include one or more of the following configurations, in various embodiments:

A protocol,

A protocol configuration,

Time and frequency parameters of a protocol, e.g. time delays between transmission and response such as between transmission and ACK/NACK or between scheduling grant and corresponding transmission A waveform, A set of parameters for a waveform, A frame structure configuration, e.g. time-frequency parameters of a frame structure, Supported multi-antenna schemes, such as the maximum number of spatial layers.

In various embodiments, the RAR may not explicitly comprise the information or parameter values, but rather an index pointing out a configuration in a table or a list, where the configuration in turn explicitly specifies information and parameter values. Such a table or list of configurations could be specified in a standard document, system information or a radio resource control (RRC) configuration.

Various embodiments of a method for termination by inspection of RAR content may be substantially similar to the steps of FIG. 10 and FIG. 11, but with step 1008/1109 updated to include the inspection of the RAR content of successfully decoded RARs and making the decision to terminate based on such content, instead of whether a priority indicator is contained in the decoded RAR. In various embodiments, a termination decision based on RAR content inspection could also be combined with inspection of a priority indicator in RARs, as described above. In such embodiments, step 1009 in FIG. 10 would select the successfully decoded RAR whose content triggered the termination in the previous step, for instance since it indicated that sufficient QoS could be provided, in accordance with various embodiments. In various embodiments, the decision to terminate is based on the RAR measurement by itself or in combination with other parameters such as the RAR content and/or a priority indicator. In some embodiments, the RAR reception may be terminated if the measured received power level of the RAR is above a threshold.

In various embodiments, a device may take into account the additional delay, energy consumption, etc, proceeding RAR reception, when the device is to decide whether to terminate the RAR reception and decoding. For example, if a service with strict latency requirements triggered the random access, the device may choose to terminate the RAR reception as soon as a RAR with sufficient capabilities, etc, is received, in order to immediately proceed with the next steps. In another example, if a service without strict latency requirements triggered the random access, the device can afford to receive multiple or all RARs before selecting. In a third example, a device with strict energy consumption constraints may choose to terminate RAR reception and decoding after the first successfully decoded RAR, and in some embodiments, choose the first RAR from a sufficiently capable TRP, in order to save energy.

Various embodiments with device-side RAR reception termination based on RAR content may be applicable for centralized RAS detection, distributed RAS detection and separate RAS detection. Even if the TRPs transmitting RARs are fully coordinated, the RAS itself may not convey enough device-side information (service requirements etc.) to make it possible for the network to decide which TRP(s) may serve the device in the forthcoming communication. If the network has such information, it may just let the most suitable TRP(s) to transmit a single RAR and let the device use single RAR reception. Instead, multiple RARs may be transmitted by different TRPs and the device may choose which RAR to respond to depending on the full information on the device side, in various embodiments. In some embodiments, a network may transmit different RARs from the same, or largely overlapping, TRPs, but with different RAR content. This could be used by the network to offer different modes of communication, configurations, etc, already in the RAR stage, with the device selecting the most suitable mode, configuration, etc, by responding to the corresponding RAR. With RAR reception termination based on the RAR content, a device could terminate RAR reception and decoding early, if an already received RAR is deemed sufficient, based on the requirements, measurements and other conditions on the device-side.

The termination based on RAR content may be sensible also for embodiments with RARs transmitted from separate TRPs without the possibility of extensive RAR coordination, for similar reasons as mentioned above.

In some areas, single RAR reception may be more suitable, while in other areas multiple RAR reception may be more suitable. To enable the simultaneous and dynamic use of the different RAR reception methods in different areas in a network, some embodiments may include single and multiple RAR reception configurations in the RAR configuration, which may be part of the random access configuration, which in turn may be part of the system information. In some embodiments, a device-specific random access configuration can also be configured with dedicated (device-specific) signaling, for instance, through radio resource control (RRC) signaling. In general, a dedicated random access configuration, e.g. through RRC signaling, is typically semi-static. This means that it is changed on a time-scale significantly greater than the shorter (dynamic) time-scale of RAS detection and corresponding RAR transmission. In the LTE example, the shorter dynamic time-scale is in the order of milliseconds, while the semi-static time-scale of RRC reconfigurations is typically in the order of tens or hundreds of milliseconds or more. In future system, for instance the 5G network, the dynamic time-scale is anticipated to be in the order of 0.1 millisecond, while the semi-static time-scale can be ten times than that or more.

In some embodiments, system information includes multiple random access configurations, and thereby possibly multiple RAR reception termination configurations. The main distinction between such embodiments and other exemplary embodiments discussed above is that in the system information embodiments, a device obtains single or multiple RAR reception termination configuration, for example, through system information or RRC signaling. In contrast, the previously described exemplary embodiments are directed to the reception of priority indicator(s) in the RAR and the subsequent termination, and to the inspection of RAR content and subsequent termination. In some embodiments, a device selects between multiple random access configurations (and possibly thereby RAR reception termination configurations) based on measurement results, e.g. from reference signal(s) measurements. Hence, in some embodiments, step 802 in FIG. 8 (and corresponding steps in FIGS. 9-11) can be split into two sub-steps (802-1 and 802-2), as follows:

802-1: The device chooses one of multiple random access configurations, which have been received as part of the system information. The choice may be based on reference signal(s) measurements.

802-2: Based on the choice in 802-1, the device obtains a random access configuration, which in many cases is included in the system information. The random access configuration may include:

(a) The RAS configuration. This may include a set of resources that a device may use to transmit a RAS and/or a RAS transmit power configuration.

(b) The RAR configuration. This may include instructions on how the device should attempt to receive and decode a RAR, e.g. instructions on how a device should derive the resources used for RAR (the RAR resources) based on which RAS resource the device selected. In LTE, the RAR configuration includes the RAR window.

For example, in some embodiments, multiple random access configurations are stored in a table called an Access Information Table (AIT). Based on measurements on signals called SSI (System Signature Index), the device selects one entry in the table. An entry includes a random access configuration. Conventional systems and methods, however, did not disclose or suggest including a configuration of RAR reception termination. In various embodiments, an AIT entry includes a configuration of RAR reception termination. SSI measurements are used to select an AIT entry and thereby a RAR reception termination configuration.

In various non-limiting embodiments, what a RAR reception termination configuration indicates (or instructs) is listed as follows. One of the below instructions is used at a time by a device. The instructions may be used in parallel to different devices.

RAR reception is terminated after the first successfully decoded RAR (single RAR reception).

RAR reception and decoding is done for all configured RAR resources (multiple RAR reception)

RAR reception is terminated after the first X successfully decoded RARs, where X may be an integer greater than or equal to 1.

RAR reception is terminated if a decoded RAR is received with greater power than a certain threshold. The threshold may be configured in the RAR reception termination configuration.

RAR reception is terminated based on the reception of one or more priority indicators, included in RARs, as described above. The RAR reception termination configuration may include a further configuration of the termination based on priority indicators, in various embodiments.

RAR reception is terminated based on the content of one or more successfully decoded RARs, as described above. The RAR reception termination configuration may include a further configuration of the termination conditions based on RAR content, in various embodiments.

Various embodiments of a device procedure for termination according to RAR reception termination configuration may be described by FIGS. 10 and 11, but with a few updates, as provided below:

Step 1002 (or 802-2/1002-2/1102-2 for embodiments where Step 802 is divided into two sub-steps as described above): The device also obtains a RAR reception termination configuration, as included in a random access configuration, in various embodiments.

Steps 1008/1109: Depending on the configuration in the RAR reception termination configuration, in various embodiments, the device decides if the RAR reception and decoding should be terminated. This step would involve different detailed sub-steps depending on the termination criterion, e.g.

In some embodiments where a device is configured to inspect a priority indicator, this step would involve such an inspection.

In some embodiments where a device is configured to evaluate the content of one or more RARs as described above, this step would involve such an evaluation.

In some embodiments where a device is configured to use single RAR reception, this step would involve deciding termination after the first successfully decoded RAR.

In some embodiments where a device is configured to use multiple RAR reception, this step would involve deciding to not terminate the RAR reception.

Step 1009 (in FIG. 10): In various embodiments, where the previous step involved termination because a successfully decoded RAR fulfilled a selection criterion (see the previous step for various embodiments), this step would involve the selection of the RAR that fulfilled the criterion.

A network may be heterogeneous, in various embodiments, with some areas having TRPs that operate with joint processing in a centralized baseband processing unit, and other areas having TRPs that operate with separate processing with a minimal level of coordination and joint processing and other areas working in other ways. In such a heterogeneous network, it may be suitable to allow different RAR reception methods in different areas. For instance, single RAR reception could be used by devices in an area where this is suitable, while multiple RAR reception could be used by devices in an area where this is suitable, as discussed previously. Hence, in various embodiments, different single/multiple RAR reception configurations are provided in different areas. This can be achieved in various ways in different embodiments.

In various network embodiments, the network is divided into different cells, where a cell covers an area, and where a cell has its own system information. In various such embodiments, different cells may use different single/multiple RAR reception configurations (e.g. included in the system information), depending on what is suitable in the area covered by the cell. This would typically depend on the level of coordination and joint processing between the TRPs that are used to create a cell.

In various network embodiments, a large area is not explicitly divided into cells, as in traditional cellular systems. Instead, devices may obtain different single/multiple RAR reception configurations based on measurements, which indicate which system information out of several that a device should use, in various embodiments. In some embodiments, the system information in a large area could be in the form of an AIT. Depending on in which small area within the large area that a device is, it could select different entries in the AIT, for instance based on SSI measurements. Hence, with different single/multiple RAR reception configurations in different AIT entries (i.e. in different random access configurations), different devices in the area could use different termination methods.

In various embodiments, different random access configurations, and thereby single/multiple RAR reception configurations, may be provided (e.g. by system information transmission) in different areas, by other means than those described in the embodiments above.

While various embodiments of the invention have been described above, it should be understood that they have been presented by way of example only, and not of limitation. Likewise, the various diagrams may depict an example architectural or other configuration for the invention, which is done to aid in understanding the features and functionality that can be included in the invention. The present invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

One or more of the functions described in this document may be performed by one or more appropriately configured units. The term "unit" as used herein, refers to software that is stored on computer-readable media and executed by one or more processors, firmware, hardware, or any combination of these elements for performing the associated functions described herein. Additionally, for purpose of discussion, the various units may be discrete units; however, as would be apparent to one of ordinary skill in the art, two or more units may be combined to form a single unit that performs the associated functions according embodiments of the invention.

Additionally, one or more of the functions described in this document may be performed by means of computer program code that is stored in a "computer program product," "computer-readable medium," and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

It will be appreciated that, for clarity purposes, the above description has described embodiments of the invention which can be implemented with one or more functional units and/or processors. However, it will be apparent that any suitable distribution of functionality between different functional units, processors or domains may be used without detracting from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization.

What is claimed is:

1. A wireless communication device comprising:
a processor configured to receive one or multiple random access response (RAR) signals, wherein when the processor receives and successfully decodes the one or multiple RAR signals, the processor is further configured to select and respond to a RAR signal based on the received and successfully decoded one or multiple RAR signals,
wherein the processor is further configured to terminate further reception of RAR signals based on a content of the received and successfully decoded one or multiple RAR signals, wherein the content instructs the processor to terminate further reception of RAR signals before an end of a predetermined RAR window for transmitting additional RAR signals, and
the processor proceeds with subsequent wireless communication using information contained in the selected RAR signal after terminating further reception of RAR signals.

2. The wireless communication device of claim 1, wherein the content of the at least one RAR signal comprises a priority indicator and where the processor is further configured to terminate further reception of RAR signals if the priority indicator value is above or below a predetermined threshold value.

3. The wireless communication device of claim 1, wherein the content of the at least one RAR signal further comprises at least one parameter from a group consisting of: processing capabilities, storage capabilities, radio load, backhaul load, fronthaul load, processing load, storage load, offered quality of service (QoS), offered latency, offered throughput, offered reliability, supported frequency bands, supported network slices and supported mode of communication.

4. The wireless communication device of claim 1, wherein the processor is further configured to select a RAR signal based on measurements performed on the one or multiple RAR signals.

5. The wireless communication device of claim 1, wherein the processor is further configured to select a RAR signal based on a content of at least the one or multiple RAR signals.

6. The wireless communication device of claim 5, wherein the content of the selected RAR signal comprises a priority indicator and wherein the processor is further configured to select the selected RAR signal based on a value of the priority.

7. The wireless communication device of claim 6, wherein the processor is further configured to select the RAR signal based also on at least one measurement performed on the one or multiple RAR signals.

8. The wireless communication device of claim 7, wherein the at least one measurement comprises a measurement of received power upon receiving the one or multiple RAR signals.

9. A method of dynamically processing a random access response (RAR) signal to perform wireless communications, the method comprising:
receiving and decoding a first RAR signal from a first RAR resource;
determining if a content of the first RAR signal instructs a receiving device to terminate reception and decoding of additional RAR signals; and
in response to determining that the content of the first RAR signal instructs the receiving device to terminate reception and decoding of additional RAR signals, terminating reception of additional RAR signals before an end of a predetermined RAR window for transmitting the additional RAR signals, and proceeding with the wireless communication using information contained in the first RAR signal based on the content of the successfully decoded first RAR signal after terminating further reception of RAR signals.

10. The method of claim 9 wherein when the content of the first RAR signal instructs the receiving device to terminate reception and decoding of additional RAR signals, the content comprises a priority indicator having a value above or below a predetermined threshold value.

11. The method of claim 9 wherein when the content of the first RAR signal instructs the receiving device to terminate reception and decoding of additional RAR signals, the content of the at least one RAR signal comprises at least one parameter from a group consisting of: processing capabilities, storage capabilities, radio load, backhaul load, fronthaul load, processing load, storage load, offered quality of service (QoS), offered latency, offered throughput, offered reliability, supported frequency bands, supported network slices and supported mode of communication.

12. The method of claim 9 further comprising performing a measurement on the first RAR signal and determining whether to terminate reception of further RAR signals based the measurement and the content of the first RAR signal.

13. The method of claim 9 wherein when the content of the first RAR signal does not instruct the receiving device to terminate reception and decoding of additional RAR signals, and a second RAR resource is available to send a signal to the device, the method further comprises receiving and decoding the second RAR signal from the second RAR resource.

14. The method of claim 13 further comprising:
determining if a content of the second RAR signal instructs the receiving device to terminate reception and decoding of additional RAR signals; and
when the content of the second RAR signal instructs the receiving device to terminate reception and decoding of additional RAR signals, terminating reception of additional RAR signals before an end of a predetermined RAR window for transmitting the additional RAR signals, and proceeding with the wireless communication using information contained in the second RAR signal; and
when the content of the second RAR signal does not instruct the receiving device to terminate reception and decoding of additional RAR signals, determining whether a third RAR resource is available to send a signal to the device.

15. The method of claim 14, wherein when the content of the second RAR signal does not instruct the receiving device to terminate reception and decoding of additional RAR signals, and the third RAR resource is not available, the method further comprises:
performing a measurement on the second RAR signal; and
selecting either the first RAR signal or the second RAR signal based on the measurements on the first and second RAR signals, wherein information contained in the selected first or second RAR signal is used to proceed with the wireless communication.

16. A non-transitory computer-readable medium storing computer-executable instructions that when executed perform a method of dynamically processing a random access response (RAR) signal to perform wireless communications, the method comprising:
receiving and decoding a first RAR signal from a first RAR resource;
determining if a content of the first RAR signal instructs a receiving device to terminate reception and decoding of additional RAR signals; and
in response to determining that the content of the first RAR signal instructs the receiving device to terminate reception and decoding of additional RAR signals, terminating reception of additional RAR signals before an end of a predetermined RAR window for transmitting the additional RAR signals, and proceeding with the wireless communication using information contained in the first RAR signal based on the content of the successfully decoded first RAR signal after terminating further reception of RAR signals.

17. The non-transitory computer-readable medium of claim 16 wherein when the content of the first RAR signal instructs the receiving device to terminate reception and decoding of additional RAR signals, the content comprises a priority indicator having a value above or below a predetermined threshold value.

18. The non-transitory computer-readable medium of claim 16 wherein when the content of the first RAR signal instructs the receiving device to terminate reception and decoding of additional RAR signals, the content of the at least one RAR signal comprises at least one parameter from a group consisting of: processing capabilities, storage capabilities, radio load, backhaul load, fronthaul load, processing load, storage load, offered quality of service (QoS), offered latency, offered throughput, offered reliability, supported frequency bands, supported network slices and supported mode of communication.

19. The non-transitory computer-readable medium of claim 16 wherein the method further comprises performing a measurement on the first RAR signal and determining whether to terminate reception of further RAR signals based the measurement and the content of the first RAR signal.

20. The non-transitory computer-readable medium of claim 16, wherein when the content of the first RAR signal does not instruct the receiving device to terminate reception and decoding of additional RAR signals, and a second RAR resource is available to send a signal to the device, the method further comprises receiving and decoding the second RAR signal from the second RAR resource.

21. The non-transitory computer-readable medium of claim 20 wherein the method further comprises:
 determining if a content of the second RAR signal instructs the receiving device to terminate reception and decoding of additional RAR signals; and
 when the content of the second RAR signal instructs the receiving device to terminate reception and decoding of additional RAR signals, terminating reception of additional RAR signals before an end of a predetermined RAR window for transmitting the additional RAR signals, and proceeding with the wireless communication using information contained in the second RAR signal; and
 when the content of the second RAR signal does not instruct the receiving device to terminate reception and decoding of additional RAR signals, determining whether a third RAR resource is available to send a signal to the device.

22. The non-transitory computer-readable medium of claim 21 wherein when the content of the second RAR signal does not instruct the receiving device to terminate reception and decoding of additional RAR signals, and the third RAR resource is not available, the method further comprises:
 performing a measurement on the second RAR signal; and
 selecting either the first RAR signal or the second RAR signal based on the measurements on the first and second RAR signals, wherein information contained in the selected first or second RAR signal is used to proceed with the wireless communication.

* * * * *